June 19, 1951

C. A. BICKEL ET AL 2,557,860

MACHINE TOOL

Filed Aug. 22, 1945

INVENTOR
CLIFFORD A. BICKEL
STANLEY A. BRANDENBURG
BY THEODORE FOSTER

Toulmin & Toulmin
ATTORNEYS

Patented June 19, 1951

2,557,860

UNITED STATES PATENT OFFICE 2,557,860

MACHINE TOOL

Clifford A. Bickel, Stanley A. Brandenburg, and Theodore Foster, Sidney, Ohio, assignors to The Monarch Machine Tool Co., Sidney, Ohio, a corporation of Ohio Application August 22, 1945, Serial No. 611,932

8 Claims. (Cl. 82—21)

This invention relates to machine tools and, particularly to machine tools having multiple unit mechanisms for turning contour shapes on a workpiece.

The object of this invention is to provide a machine tool consisting of simple components so arranged that relatively complex workpieces may be machined.

Another object is to provide a lathe having tool reciprocating slides which are superimposed so that simple reciprocatory movement of the slides result in compound movements of the tool.

Still another object is to provide a lathe having a work holding device and multiple superimposed tool slides, the movement of which controls the actuation thereof so that complex contours can be machined.

Still another object is to provide a machine tool having a tool support consisting of superimposed slides in which each slide is an integral unit having its own source of power and driving mechanism.

Another object is to provide a machine tool according to the foregoing object in which the movements of the slides are interlocked by suitable control means operated by the movements of the slides.

These and other objects and advantages will become more apparent upon reference to the accompanying drawings in which:

Figure 7 is a diagrammatic plan view illustrating the relative location of the various control limit switches of the superimposed slides.

General arrangement

Figure 1:
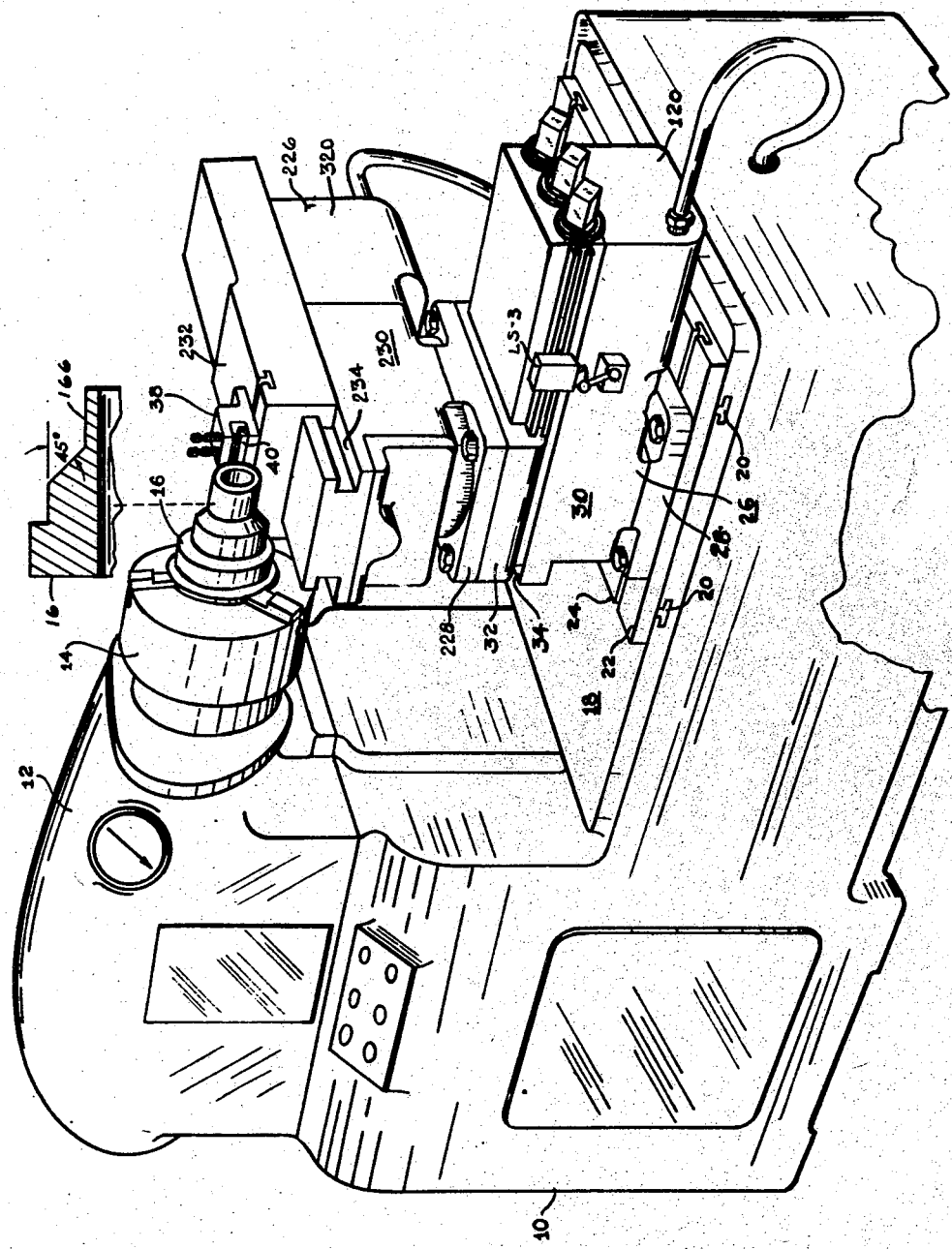
Figure 1 is a perspective view showing one form of machine tool according to the present invention.

According to this invention there is provided a headstock which has a rotatable element suitable for supporting and driving a workpiece. The headstock is preferably carried on a machine bed which comprises a pad for receiving the compound tool support of this invention.

The pad preferably comprises T-slots on which the tool slide assembly is mounted for initial positioning.

The tool slide itself comprises a first slide reciprocable in a first direction and a second slide mounted thereon reciprocable in a second direction. Each slide has connected therewith by a first and a second driving means a drive motor. By means of electrically actuated magnetic clutches and brakes either the first or the second driving means of either one or both of the slides may be made effective for simple or compound reciprocation of the tool, while all of the driving means may be made ineffective for causing the tool to dwell.

By suitably arranging limit switches to be actuated by the slides during their travel and by providing an electrical circuit connected with the limit switches, the operation of the slides may be automatically controlled through a complete cycle.

Each of the slides is a portion of an integral unit which preferably includes a swivel so that the directions of reciprocation of the slides may be varied to conform to the particular configuration which it is desired to generate on the workpiece.

Structural arrangement

Referring to the drawings, 10 indicates a bed which mounts a headstock 12 having a rotatable, work supporting member such as the chuck 14 which carries the workpiece 16 to be turned.

The bed 10 also comprises a pad 18 having the T-slots 20 which adjustably secure the plate 22 having the T-slots 24. Adjustably mounted on the plate 22 by the T-slots 24 is a unit generally indicated at 26 which consists of a bed plate 28, an intermediate bed 30 pivoted thereto, and a slide 32 reciprocable on the intermediate bed on the ways 34.

The slide 32 mounts a second unit which may be identical with the unit 26 and which is indicated generally by the numeral 226 and the various parts of which are identified by numerals two hundred units higher than those of the unit 26.

The slide 232 of the unit 226 mounts a tool holder 38 and tool 40 for cutting the workpiece 16.

Each of the units 26 and 226 comprises a reversible electric motor 50 and 250, respectively, and a first and a second gear train interconnecting the motor with the slide. These mechanisms may be identical and the one associated with the unit 26 is illustrated in Figure 2.

Drive mechanisms for slides

Figure 2:
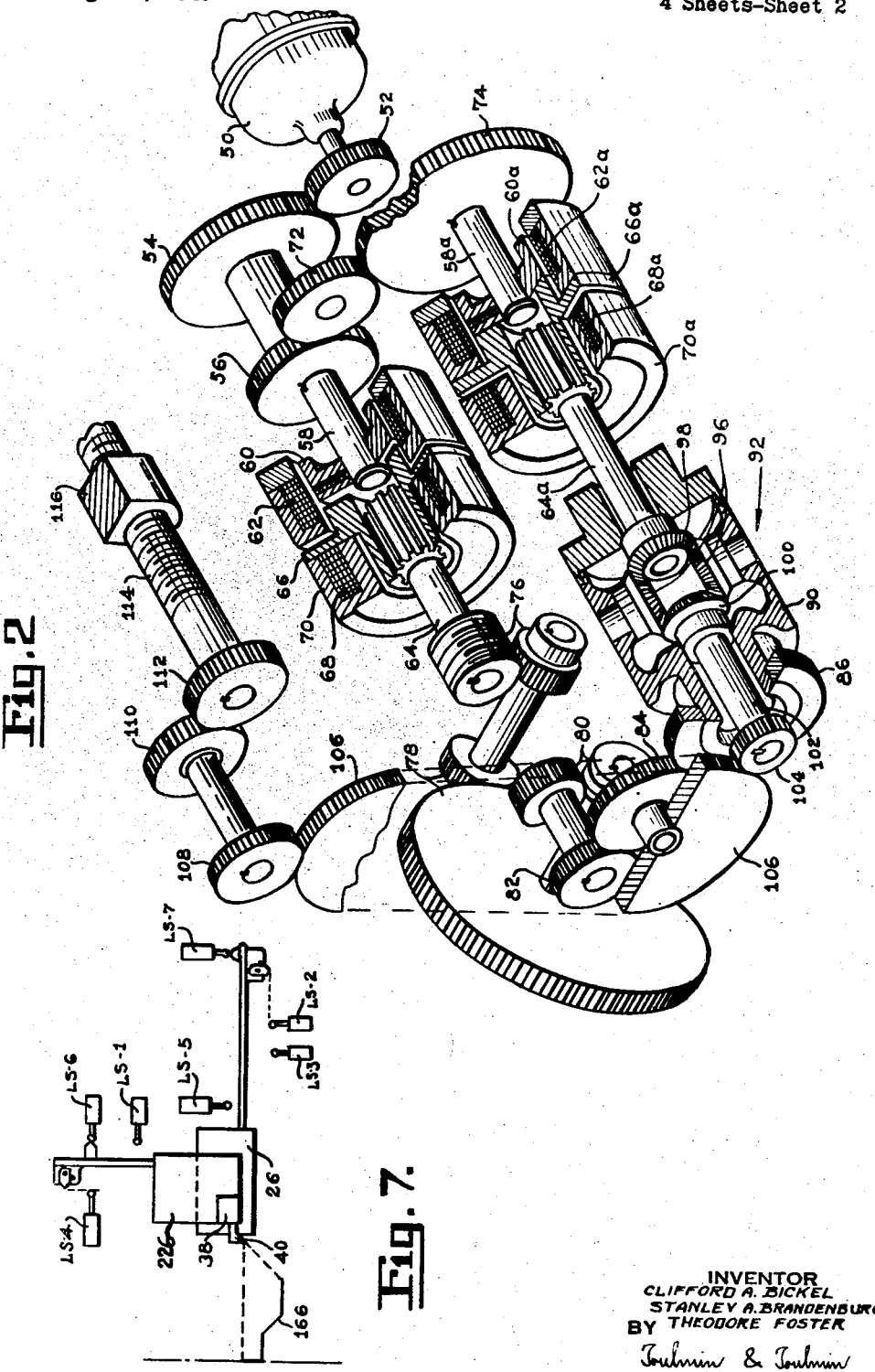
Figure 2 is a diagrammatic perspective view showing the drive mechanism associated with one of the tool slides.

In Figure 2 there is a drive motor 50 which is preferably electrically reversible such as a direct current motor or a three phase alternating current motor, the latter being the one employed for the purposes of illustration. The motor 50 drives a pinion 52 which meshes with a gear 54 which has attached thereto a gear 56 and a shaft 58. The shaft 58 carries a magnetic member 60 which forms a portion of the core for the stationary coil 62. In axial alignment with the shaft 58 spaced therefrom is a shaft 64 which has splined thereto an armature 66 which has a face adapted for frictional engagement with the face of the member 60. The arrangement is such that when the coil 62 is energized, the armature 66 is drawn rightwardly into frictional engagement with the member 60 to establish a driving connection from the shaft 58 to the shaft 64.

On the opposite side of the armature 66 from the coil 62 is a coil 68 having a core 70. The coil and core 68, 70 are stationary and the armature 66 is adapted, when the coil 68 is energized, frictionally to engage the core 70 thereby to lock the shaft 64 against rotation.

Thus, by energizing the coil 62 while the coil 68 is de-energized, the shaft 64 is driven by the shaft 58 and, by energizing the coil 68 while the coil 62 is de-energized, the shaft 64 is locked against rotation.

The aforementioned gear 56 drives through an idler gear 72 to a gear 74 which is carried on a shaft 58a. The shaft 58a corresponds to the shaft 58 in being the input shaft of an electrically actuated clutch-brake arrangement which is identical with the one described above and which has its various parts identified by similar numerals except with the addition of a subscript a.

The shaft 64 drives through a worm and wheel arrangement at 76 into a set of change gears at 78 which, in turn, drive through a worm and wheel arrangement at 80 into a gear 82 which drives through an idler gear 84 into a gear 86. The gear 86 is carried on the housing 90 of a geared differential generally indicated at 92 which also comprises the bevel gears 96 journalled in the housing. Each of the gears 96 mesh with a bevel gear 98 on the shaft 64a and a bevel gear 100 on the output shaft 102 of the differential.

The shaft 102 drives a gear 104 which meshes with an idler gear 106 that also meshes with a gear 108 attached to the gear 110. The gear 110 drives into a gear 112 that is connected with the screw 114 which threadedly engages a nut 116 carried by the slide 32.

When the clutch coil 62a is de-energized and the brake coil 68a is energized while the clutch coil 62 is energized and the brake coil 68a is de-energized, the motor drive is through the shafts 58 and 64 into the housing 90 of the differential 92 while the input shaft 64a thereof is locked. Rotation of the housing 90 causes the gears 96 to roll on the now stationary gear 98 to drive the gear 100 and therethrough the screw 114 for reciprocating the nut 116 and slide 32 at a predetermined rate. By de-energizing the aforementioned energized clutch and brake coils and energizing those that were de-energized, the motor drive is through the shafts 58a and 64a into the gear 98 of the differential while the shaft 64 and therethrough the differential housing are locked. The drive is then through the gears 96 and 100 to the screw 114 which reciprocates the nut 116 and the slide 32 in the same direction at a second predetermined rate.

The worm and wheel units at 76 and 80 and the change gears at 78 are so selected that when the drive to the slide 32 is therethrough its speed of traversal is substantially lower than when the drive is directly through the differential to the said slide. Thus, an initial rapid traverse and a subsequent feed of the slide may be obtained.

By de-energizing both of the clutch coils and energizing both of the brake coils the drive to the slide may be locked and hence, the slide itself locked against movement.

By reversing the motor 50 the direction of reciprocation of the table 32 may be reversed so that a rapid retraction stroke may be had.

The table 232 is similarly reciprocated at fast traverse, feed and rapid retraction rates.

Each of the units 26 and 226 comprises a hollow portion in their intermediate beds indicated at 120 and 320 respectively. These hollow portions mount a plurality of limit switches and actuating cams therefor as shown in Figures 3, 4 and 5 wherein the portion 120 of the unit 26 is illustrated.

Figure 3:
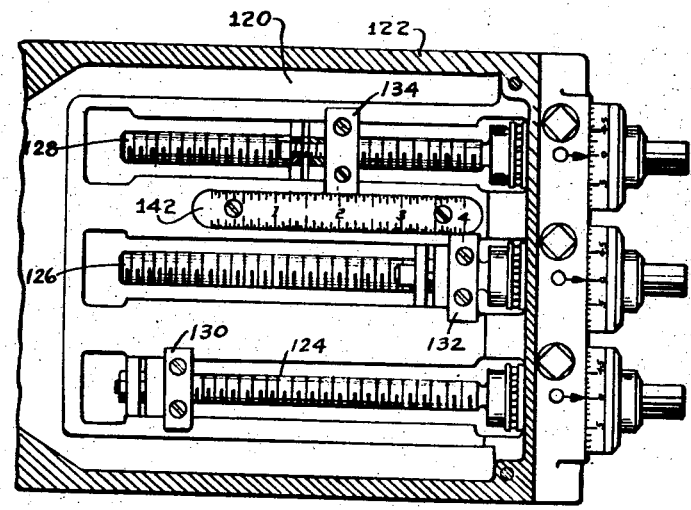
Figures 3, 4 and 5 are sectional views showing the limit switches and actuating means therefor associated with one of the slides.
Figure 4:
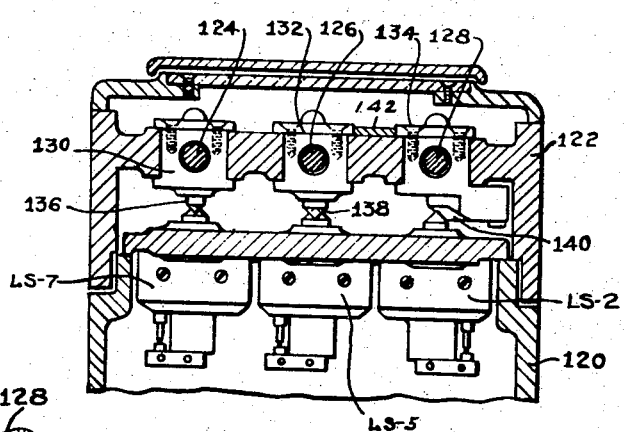
Figure 5:
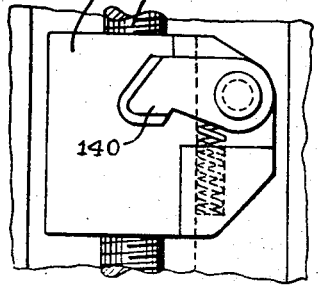

In Figures 3 and 4 it will be noted that the slide 32 has a portion 122 which carries the threaded rods 124, 126 and 128 which engage respectively the blocks 130, 132 and 134.

The block 130 comprises a cam 136 adapted for actuating a limit switch LS7 when the slide is in its fully retracted position. The block 132 carries a cam 138 adapted for actuating a limit switch LS5 when the slide has been fed in its full distance, and the block 134 comprises a cam 140 which actuates a switch LS2 when the slide has reached a predetermined point in its advancing travel.

The last mentioned cam and limit switch are idle during the return stroke of the slide.

A scale 142 may be provided for the accurate positioning of the blocks 132 and 134 if desired.

*Electrical system*

Figure 6:
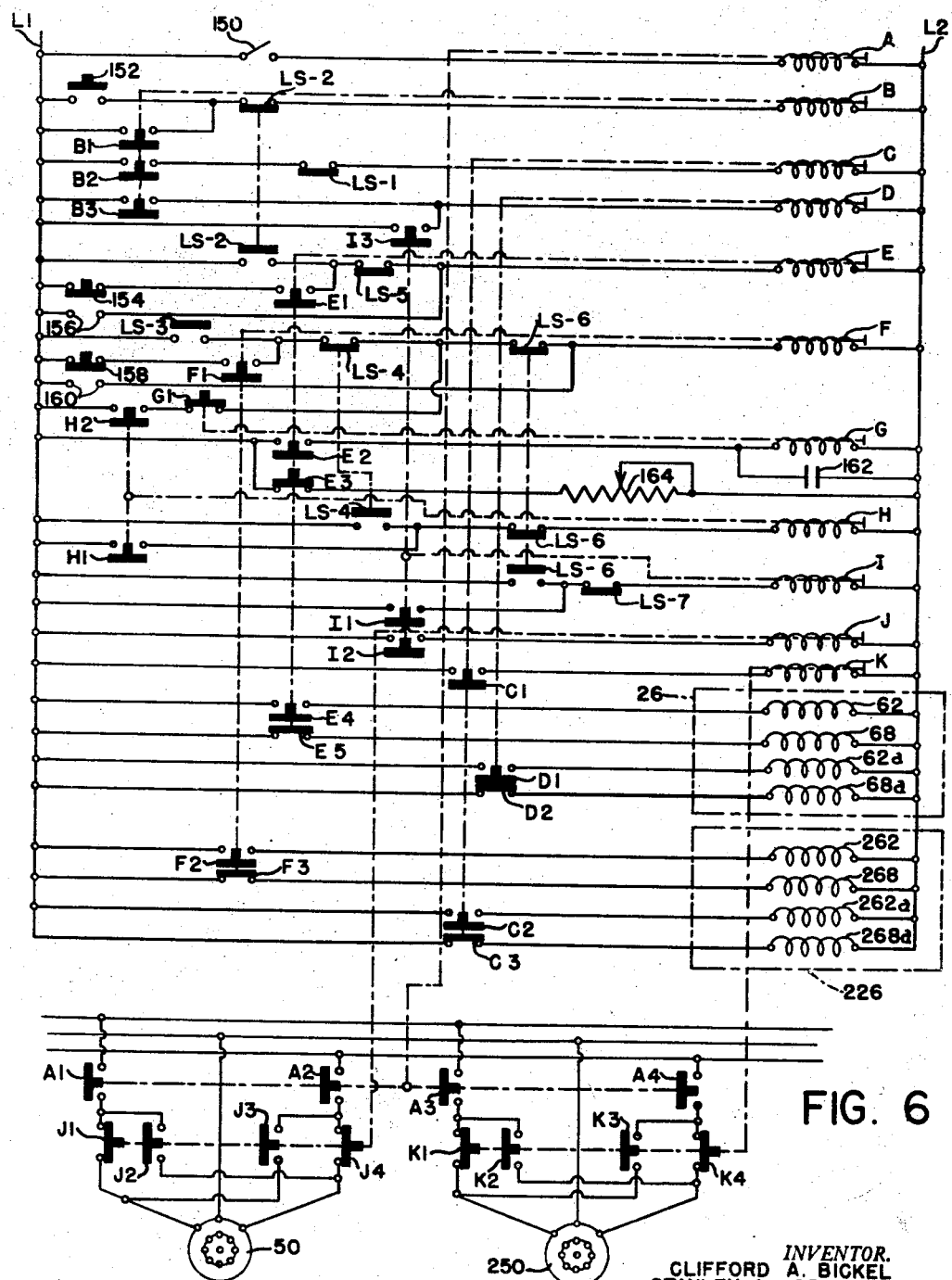
Figure 6 illustrates an electrical operating circuit for controlling and interlocking the slides.

In Figure 6 the power lines L1 and L2 are preferably supplied with direct current from a suitable source. Connected between the lines is a contactor coil A in series with a main switch 150. Energization of A closes the blades A1, A2, A3 and A4 and energizes the drive motors 50 and 250 for the upper and lower slide units.

The contactor coil B is connected in series with a normally closed blade of the limit switch LS2 and a start cycle switch 152, the latter being bypassed by the normally open blades B1. A contactor coil C is connected in series with the normally open blades B2 and a normally closed blade of the limit switch LS—1", and the contactor coil D is connected in series with the paralleled and normally open blades B3 and I3.

The contactor coil E is connected in series with the normally closed limit switch LS5 and the normally open blade of the limit switch LS2. A branch line from L1 including a normally closed jog switch 154 and the normally open blades E1 bypass the aforementioned blade of LS2. A second branch line including contacts 156 adapted for being closed by the jog switch 154 bypass both the blade LS2 and the switch LS5.

The contactor coil F is connected in series with a normally closed blade of a switch LS6, a normally closed blade of a switch LS4 and the normally open switch LS3. The switch LS3 is bypassed by a line which includes the normally closed jog switch 158 and the normally open blades F1. A second branch line which includes the normally open contacts 160 adapted for being closed by the jog switch 158 bypasses the switches LS3, LS4 and LS6.

A third branch line which includes the normally open blades H2 and the normally closed blades G1 bypass the switches LS3 and LS4.

A contactor coil G is connected in series with the normally open blades E2 and has parallel therewith a condenser 162 and also in parallel with the coil G is a branch path including the normally closed blades E3 and an adjustable resistor 164.

A contactor coil H is in series with a normally closed blade of the switch LS6 and a normally open blade of the switch LS4, the latter being bypassed by a line including the normally open blades H1.

The contactor coil I is connected in series with the normally closed switch LS7 and a normally open blade of the switch LS6, the latter being bypassed by a line including the normally open blades I1. The normally open blades I2 are in series with a contactor coil J which, when energized, opens the blades J1 and J4 and closes the blades J2 and J3 for reversing the drive motor 50 of the unit 26. The normally open blades C1 are connected in series with a contactor coil K which, when energized, opens the blades K1 and K4 while closing the blades K2 and K3, for reversing the drive motor 250 of the unit 226.

The brake and clutch coils of the units 26 and 226 are indicated within properly identified dot-dash outlines and are connected as follows.

The feed clutch 62 of the unit 26 is in series with the normally open blades E4 while the feed brake coil 68 of the unit 26 is in series with the normally closed blades E5. The traverse clutch coil 62a of the unit 26 is in series with the normally open blades D1 while the traverse brake coil 68a of the unit 26 is connected in series with the normally closed blades D2. The feed clutch coil 262, the feed brake coil 268, the traverse clutch coil 262a and the traverse brake coil 268a of the unit 226 are similarly serially connected respectively, with the normally open blades F2, the normally closed blades F3, the normally open blades C2 and the normally closed blades C3.

The relative locations of the limit switches LS1 to LS7 are better shown in Figure 7. This figure diagrammatically illustrates the superimposed slides each carrying a cam rod which has cams for actuating the limit switches.

The path of the tool 40 is indicated by the line 166, of which the solid portion indicates the working part of the path and the dotted line indicates the idle part of the path. In Figure 7 the slides of the units 26 and 226 are in their fully retracted positions. To commence a work cycle, the operator closes the main switch 150 to energize coil A and to commence the rotation of both of the drive motors. Thereafter the start cycle switch 152 is closed which energizes the coils B, C, D and K and therethrough bring about in the unit 226 the energization of the traverse clutch coils 262a, the de-energization of the traverse brake coils 268a and the reversal of the drive motor 250 for the unit 226 to move its slide inwardly.

Both slides now move rapidly to approach the work. When the slide of the unit 226 has reached a position in alignment with the work it opens LS1 to de-energize coil C thereby to de-energize the clutch coil 262a and to energize the brake coil 268a of the unit 226 and also to restore the motor to its original direction of rotation. Shortly thereafter the lower slide 32 actuates LS2 which de-energizes the coils B and D and energizes the coils E and G. This energizes the feed clutch coil 62 and the traverse brake coil 68a and de-energizes the feed brake coil 68 and the traverse clutch coil 62a of the unit 26 and commences the slide thereof on its feeding movement.

After the lower slide 32 has advanced a predetermined amount, it actuates the limit switch LS3 which energizes the coil F. Energization of F energizes the feed clutch 262 and de-energizes the brake clutch 268 of the unit 226 and the slide 232 thereof moves outwardly at feeding rate, the simultaneous movement of both of the slides cooperating to cut the taper on the workpiece. When the taper is fully cut the slide 232 of the unit 226 actuates the limit switch LS4 which de-energizes coil F. This energizes the feed brake coil 268 while de-energizing the feed clutch coil 262 of the unit 226 and thus stops the feeding movement of its slide 232, the lower slide 32 continuing to move at feed rate. The limit switch LS4 also energizes the coil H to close the blades H2 thereof for a purpose to become more apparent hereinafter.

After the lower slide 32 advances a predetermined further amount, it actuates the switch LS5 to de-energize the coil E which de-energizes the feed clutch coil 62 while energizing the feed brake coil 68 of the unit 26. The movement of the slide of the unit 26 is thus halted. De-energization of E also opens the blades E2 while closing the blades E3 and, after a predetermined time delay, the coil G becomes de-energized and permits the blades G1 to close. The blades G1 are in series with the blades H2 and thereby energize the coil F to again commence the outward feed of the upper slide 232. When the upper slide is fed out a predetermined amount it actuates LS6 to de-energize the coils F and H to stop the outward feed of the upper slide, and energizes the coils D and I. Energization of D places the lower slide on traverse while energization of I brings about the energization of J to reverse the lower unit drive motor 50. The lower unit is thus rapidly retracted to its starting position where it opens the limit switch LS7 to again de-energize the coils D, I and J.

A complete work cycle is thus accomplished by the control circuit of Figure 6 and the limit switches which interlock the same with the movement of the slides.

It will be understood that the workpiece illustrated is only typical of the many which it is possible to form on a machine tool according to the present invention. For example, by suitably selecting the change gears at 78, the degree of the taper may be selected over a wide range. Also by adding further similar interlocks the slides may be made to describe a configuration on a workpiece consisting of a plurality of steps and tapers.

Either or both of the slides may be pivoted about their vertical axes so that the direction of reciprocation of each of the slides may be adjusted to further vary the configurations which it is possible to generate.

It will be observed that a machine tool constructed according to this invention comprises relatively simple units which are individually powered and which, therefore, may be combined in any desirable manner, and which are electrically interlocked so that control may be had of an entire cycle of operations.

It will be understood that various modifications and arrangements in structure could be made without departing from the spirit of our invention and, accordingly, we desire to comprehend such modifications and substitutions of equivalents as may be considered to come within the scope of the appended claims.

We claim:

1. In a machine tool; a bed; a first unit adjustably secured to said bed and comprising a slide; a second unit mounted on said slide and also comprising a slide, the last mentioned slide being adapted for mounting a work tool; each of said units comprising a motor and selective variable speed drives between said motor and the slide of the unit; each of said units also comprising electrical control means operable to render one or the other of said drives effective; and switch means carried by said units and actuated by the slides thereof for controlling the actuation of said electrical means and, therefore, of said slides for carrying said tool in a predetermined path.

2. In a machine tool; a bed; a first unit adjustably mounted on said bed and comprising a slide, a second unit mounted on said slide and also comprising a slide; each of said units including a motor and a high speed drive and a low speed drive from said motor to the slide of the unit; switch means carried by the units to be operated by the slides thereof; means controlled by said switch means and operable alternatively to render the said drives of said units effective or ineffective for carrying said second unit slide through a predetermined work path; and other switch means carried by said units operable to reverse the motor thereof for retracting said slides.

3. In a machine tool; work supporting means; tool supporting means comprising a first unit having a slide and a second unit mounted on said slide and also comprising a slide; selective speed drives in each unit operable for rapidly advancing both of said slides toward a workpiece carried by said work supporting means; means automatically operable in response to a predetermined advancing movement of said slides for halting the slide of one unit while reducing the speed of the other slide to feed rate; means responsive to a further advancing movement of said other slide for again initiating actuation of said one slide; means responsive to a predetermined movement of said one slide for halting the same; means responsive to a still further movement of said other slide for halting the same while again initiating actuation of said one slide; and means responsive thereafter to a predetermined movement of said one slide for returning both of said slides to their original position.

4. In a machine tool; a tool supporting and driving mechanism comprising a first unit having a slide and a second unit mounted on said slide and also comprising a slide; each of said units comprising a reversible motor and a high and a low speed drive interconnecting said motor with the slide of the unit; each of said units also comprising switch means adapted for actuation by the slides of the units; electrical means including clutches and brakes adapted for actuation by said switch means for rendering one or the other or both of the drive means of each of the units ineffective; and other switch means carried by at least one of said units for actuation by its slide for controlling the actuation of the electrical means of the other unit whereby said slides may be actuated individually for turning straight portions on a workpiece or may be actuated simultaneously for turning tapered portions.

5. In a machine tool supporting and driving mechanism comprising a pair of units each having a base, a bed pivotally mounted on the base and a slide reciprocably mounted on the bed; one of said units having its base fixedly supported and the other of said units having its base carried by the slide of said one unit; each of said units comprising a motor and a first driving means for driving said slide in rapid advance by said motor, and a second driving means for driving said slide at feed rate by said motor, said motor being reversible for driving said slide in retraction by one of said means; electrical means operable for rendering one or the other of said driving means ineffective or for reversing said motor; switch means carried by each unit for controlling actuation of its electrical means and operated by the slide thereof; and other switch means carried by said units and operated by their respective slides for controlling the actuation of the electrical means of the other of said slides for obtaining a complete and automatic cycle of operations.

6. In a machine tool; work supporting means; tool supporting means comprising a plurality of superposed units each of which comprises a slide; each of said units also comprising a reversible motor and a high and a low speed drive interconnecting the motor with the slide of the unit; each of said units also comprising switch means adapted for actuation by the slide thereof for rendering one or the other or both of said drives ineffective and for reversing said motor; and other switch means carried by said units for actuation by their slides for controlling the drives and the motors of the others of said units for a complete and automatic cycle of operation.

7. In a machine tool, a bed, a first unit adjustably secured to said bed and comprising a body and a slide thereon, a second unit mounted on said slide and also comprising a body and a slide thereon, the last mentioned slide being adapted for mounting a work tool, each of said units comprising motor means and selective speed drives between said motor means and the slide of the unit, each of said units also comprising electrical control means operable to render one or the other of said drives effective, first switch means directly operated by the relative movement between the body and slide of the first unit, second switch means directly operated by the relative movement between the body and slide of the second unit, said switch means controlling the actuation of said electrical control means and governing said drives and the slides for directing said tool in a predetermined path.

8. In a machine tool, a bed, a first unit adjustably mounted on said bed and comprising a body and a slide thereon, a second unit adjustably mounted on said slide and comprising a body and a slide thereon, each of said units including motor means and a high speed drive and a low speed drive from said motor means to the slide of the unit, first switch means including first and second means operated by the relative movement between the body and slide of said first unit, second switch means including first and second means operated by the relative movement between the body and slide of said second unit, means controlled by the first means of each said switch means and operable alternatively to render the said drives of said units effective or ineffective for carrying the slide of said second unit through a predetermined work path, means controlled by the second means of said switch means to reverse the motor means for retracting said slides.

CLIFFORD A. BICKEL.
STANLEY A. BRANDENBURG.
THEODORE FOSTER.

REFERENCES CITED

The following references are of record in the file of this patent:

UNITED STATES PATENTS

| Number | Name | Date |
| --- | --- | --- |
| 1,443,899 | Kusold | Jan. 30, 1923 |
| 1,757,929 | Shaw | May 6, 1930 |
| 2,173,009 | Cotal | Sept. 12, 1939 |
| 2,172,999 | Hoelscher | Sept. 12, 1939 |
| 2,351,649 | Wintermute | June 20, 1944 |
| 2,360,375 | Tutiya | Oct. 17, 1945 |